UNITED STATES PATENT OFFICE.

FRITZ BENDER, OF FRANKFORT-ON-THE-MAIN, GERMANY, ASSIGNOR TO FARBWERK MÜHLHEIM, VORMALS A. LEONHARDT & CO., OF MÜHLHEIM-ON-THE-MAIN, GERMANY.

CYANMETHYL-ANTHRANILIC ACID AND PROCESS OF MAKING SAME.

SPECIFICATION forming part of Letters Patent No. 662,754, dated November 27, 1900.

Application filed July 28, 1900. Serial No. 25,145. (No specimens.)

*To all whom it may concern:*

Be it known that I, FRITZ BENDER, chemist, doctor of philosophy, a subject of the Emperor of Germany, residing at 85 Mainzerlandstrasse, Frankfort-on-the-Main, Prussia, Germany, have invented new and useful Improvements in Cyanmethyl-Anthranilic Acid and Process of Making Same, (for which Letters Patent have been applied for in England, No. 5,763, dated March 27, 1900; in Germany, F. 12,538, dated January 9, 1900; in Germany, F. 12,717, dated March 8, 1900, which application was subdivided from application F. 12,442, filed December 4, 1899, and in France, No. 287,746, filed April 21, 1900,) of which the following is a specification.

Prior to my invention cyanmethyl-anthranilic acid was unknown. I have invented a process for making it and have studied the properties of the product so obtained, and I have found that it is easily converted into phenyl-glycocol-ortho-carboxylic acid, its esters or its salts, all of which are valuable initial materials in the synthetic production of indigo. On account of the ease and cheapness with which my new process enables one to produce cyanmethyl-anthranilic acid (which for the sake of brevity I may hereinafter refer to as the "new" acid) this new product and the method of making it promise to be of great technical importance.

In this application I desire to claim this new product, however produced, in its unesterified as well as its esterified form and the hereinafter-described process and its equivalents.

I have discovered that under certain conditions of treatment anthranilic acid, hydrocyanic acid, and formic aldehyde can be made to yield the above-named cyanmethyl-anthranilic acid.

In the following I illustrate the nature of my invention by several examples; but the invention is not limited to them. The parts are by weight.

*Example 1—Production in aqueous solution.*—Make a solution of thirteen and seven-tenths (13.7) parts of anthranilic acid (in the form of its hydrochloric-acid salt) in about one hundred (100) parts of water. At the ordinary temperature add an aqueous solution of six and seven-tenths (6.7) parts of potassium cyanid, (one hundred per cent.) Care is to be taken that the liquid at this stage does not turn Congo-paper blue. If, however, such condition does exist, it must be removed by the addition of potassium cyanid, sodium acetate, or the like. Now add seven and one-half (7.5) parts of a forty-per-cent (40%) solution of formic aldehyde and stir the liquid. The cyanmethyl-anthranilic acid separates out as a white precipitate. It can be crystallized from dilute alcohol and then melts at about one hundred and eighty-four (184°) degrees centigrade. It dissolves in a cold solution of carbonate of soda or of caustic soda and can be precipitated from this solution by means of hydrochloric acid. By saponification and suitable subsequent treatment it yields phenyl-glycocol-ortho-carboxylic acid, which can be recognized by any of the well-known tests for that body.

If my new acid is converted into its sodium salt and is then heated with ethyl alcohol and ethyl bromide in a closed vessel, the ethyl ester of cyanmethyl-anthranilic acid, which is also new, is formed. This ester can be crystallized from alcohol and then melts at about eighty-nine (89°) degrees centigrade. It does not dissolve in carbonate-of-soda solution. The methyl ester, which can be obtained in an analogous manner, melts at one hundred and six (106°) degrees centigrade. The ethyl ester reacts also as follows: On heating with six parts of hydrochloric acid (equal volumes of water and of thirty-three (33⅓%) per cent. hydrochloric acid) it yields a crystalline body, which may be regarded as the mono-ethyl-ester of phenyl-glycocol-ortho-carboxylic acid and which melts at one hundred and eighty-four (184°) degrees centigrade. On treatment in the cold with five parts of concentrated sulfuric acid for several hours and then poured onto ice this new ester yields a body which may be regarded as the corresponding new acid amid and which can be crystallized from ethyl alcohol and then melts at one hundred and eighty (180°) degrees centigrade.

My new acid—cyanmethyl-anthranilic acid—is further characterized by yielding the neutral dialkyl esters of phenyl-glycocol-ortho-carboxylic acid when it is heated with a suitable alcohol, such as ethyl alcohol, and a suitable dehydrating agent, such as hydrochloric or sulfuric acid.

*Example 2—Production in the presence of acetic acid.*—Dissolve thirteen and seven-tenths (13.7) parts of anthranilic acid in one hundred and sixty (160) parts of acetic acid of fifty (50%) per cent., add to this solution an equivalent quantity of potassium cyanid in the form of a twenty (20%) per cent. aqueous solution, and finally the equivalent quantity of formic aldehyde. The whole is allowed to stand for about twelve (12) hours and is then warmed up to about fifty (50°) degrees centigrade for a short time, allowed to cool, and the new acid, which has separated out, is filtered off.

*Example 3—Production in alcoholic solution.*—(A) Dissolve thirteen and seven-tenths (13.7) parts of anthranilic acid in fifty-six (56) parts of methyl alcohol and add just enough concentrated hydrochloric acid to form the hydrochlorid. Now add seven (7) parts of potassium cyanid in the form of a thirty-three (33%) per cent. aqueous solution. At this stage of the process a test portion of the liquid should not turn Congo paper which has been wet with water blue. If it does, potassium cyanid must be added until it no longer does so. Now add seven and one-half (7.5) parts of a forty (40%) per cent. solution of formic aldehyde. After a short time my new acid begins to crystallize out. That which remains in solution can be obtained by precipitation with water.

Other modifications of my process may be employed—as, for example, (B) dissolve thirteen and seven-tenths (13.7) parts of anthranilic acid in fifty-six (56) parts of methyl alcohol. Now add seven and one-half (7.5) parts of a forty (40%) per cent. solution of formic aldehyde. Allow to stand for a short time. Then add four and two-tenths (4.2) parts of anhydrous hydrocyanic acid and raise the temperature to about fifty (50°) degrees centigrade and keep it there for from one (1) to two (2) hours. To the so-obtained solution add sixty (60) parts of water. Allow to stand until no more substance crystallizes out and filter off.

I have also obtained my new acid by substituting for the above-named solvents ethyl alcohol, ether, benzene, and the like.

Now what I claim is—

1. The process of making a cyanmethyl-anthranilic acid which consists in the reaction between anthranilic acid formic aldehyde and hydrocyanic acid, substantially as described.

2. As a new product, a cyanmethyl-anthranilic body, which can be obtained from anthranilic acid, hydrocyanic acid, and formic aldehyde, and which melts at about one hundred and eighty-four (184°) degrees centigrade, dissolves in a cold aqueous solution of caustic soda, and can be precipitated from this solution by hydrochloric acid and which, in the form of its ethyl ester, is a crystalline substance melting at about eighty-nine (89°) degrees centigrade, and in the form of its methyl ester is a crystalline substance melting at about one hundred and six (106°) degrees centigrade, substantially as described.

3. As a new product, a cyanmethyl-anthranilic body which can be obtained from anthranilic acid, hydrocyanic acid and formic aldehyde and which may be converted into phenyl-glycocol-ortho-carboxylic acid by saponification with hot dilute caustic-soda solution and subsequent treatment with hydrochloric acid.

In testimony whereof I have signed my name to this specification in the presence of two subscribing witnesses.

FRITZ BENDER.

Witnesses:
    JEAN GRUND,
    RICHARD GUENTHER.